United States Patent
Cheng et al.

(10) Patent No.: US 11,349,736 B1
(45) Date of Patent: May 31, 2022

(54) FLOW-BASED LATENCY MEASUREMENT FOR LOGICAL OVERLAY NETWORK TRAFFIC

(71) Applicant: VMware, Inc., Palo Alto, CA (US)

(72) Inventors: Xi Cheng, Beijing (CN); Haoran Chen, Beijing (CN); Xiaoyan Jin, Beijing (CN); Caixia Jiang, Beijing (CN); Qiong Wang, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/093,517

(22) Filed: Nov. 9, 2020

(51) Int. Cl.
| | |
|---|---|
| *G06F 15/16* | (2006.01) |
| *H04L 43/0852* | (2022.01) |
| *H04L 12/46* | (2006.01) |
| *H04L 47/2483* | (2022.01) |
| *H04L 47/32* | (2022.01) |
| *H04L 43/106* | (2022.01) |
| *G06F 9/455* | (2018.01) |
| *H04L 45/64* | (2022.01) |

(52) U.S. Cl.
CPC ...... *H04L 43/0852* (2013.01); *G06F 9/45558* (2013.01); *H04L 12/4633* (2013.01); *H04L 12/4641* (2013.01); *H04L 43/106* (2013.01); *H04L 45/64* (2013.01); *H04L 47/2483* (2013.01); *H04L 47/32* (2013.01); *G06F 2009/45595* (2013.01); *H04L 2212/00* (2013.01)

(58) Field of Classification Search
CPC .......................... H04L 43/0852; H04L 43/106
See application file for complete search history.

(56) References Cited

U.S. PATENT DOCUMENTS

| | | | | |
|---|---|---|---|---|
| 2008/0151771 | A1* | 6/2008 | Dowse | H04L 43/0858 370/252 |
| 2013/0100816 | A1* | 4/2013 | Bergamasco | H04L 47/25 370/237 |
| 2014/0211780 | A1* | 7/2014 | Kang | H04W 76/10 370/350 |

(Continued)

OTHER PUBLICATIONS

Chuck Fraleigh et al., "Packet-Level Traffic Measurements from the Sprint IP Backbone", IEEE Network, November/Dec. 2003, pp. 6-16, vol. 17, Issue 6.

(Continued)

*Primary Examiner* — Hieu T Hoang
(74) *Attorney, Agent, or Firm* — Su IP Consulting

(57) ABSTRACT

Example methods and systems for flow-based latency measurement for logical overlay network traffic are described. In one example, in response to detecting a first inner data packet associated with a packet flow, a first computer system may generate and send a first encapsulated packet via a logical overlay tunnel towards a second computer system. The first encapsulated packet may be generated by encapsulating the first inner data packet with a first outer header that includes first time information associated with the first inner data packet at the first computer system. In response to detecting a second encapsulated packet from the second computer system via the logical overlay tunnel, the first computer system may determine a flow-based latency measurement associated with the packet flow based on the first time information, and second time information identified from a second outer header of the second encapsulated packet.

21 Claims, 7 Drawing Sheets

(56) References Cited

U.S. PATENT DOCUMENTS

| | | | |
|---|---|---|---|
| 2014/0269327 A1* | 9/2014 | Fulknier | H04L 41/00 370/237 |
| 2016/0112182 A1* | 4/2016 | Karnes | G06F 1/14 375/362 |
| 2016/0315860 A1* | 10/2016 | Nichols | H04L 25/03859 |
| 2016/0380859 A1* | 12/2016 | Edsall | H04L 43/028 370/252 |
| 2017/0223062 A1* | 8/2017 | Jing | H04L 43/0852 |
| 2018/0255036 A1* | 9/2018 | Fiedler | G06F 16/955 |
| 2019/0081877 A1* | 3/2019 | Wang | H04L 12/4633 |
| 2019/0097934 A1* | 3/2019 | Zhang | H04L 47/11 |
| 2019/0109769 A1* | 4/2019 | Jain | H04L 67/2814 |
| 2020/0021532 A1* | 1/2020 | Borikar | H04L 47/11 |
| 2020/0127906 A1* | 4/2020 | Malboubi | H04L 43/0852 |
| 2020/0374228 A1* | 11/2020 | Yang | H04L 45/70 |
| 2021/0226875 A1* | 7/2021 | Chen | H04L 63/0272 |
| 2021/0235313 A1* | 7/2021 | Devadoss | H04L 43/062 |

OTHER PUBLICATIONS

Niels L. M. Van Adrichem et al., "OpenNet Mom: Network Monitoring in OpenFlow Software-Defined Networks", EEE, 2014, pp. 1-8.

Nick Mckeown et al., "OpenFlow: Enabling Innovation in Campus Networks", Acdm Sigcomm Computer Communication Review, Apr. 2008, pp. 69-74, vol. 39, No. 2.

Ramana Rao Kompella et al., "Every Microsecond Counts: Tracking Fine-Grain Latencies with a Lossy Difference Aggregator", SIGCOMM'09, Aug. 17-21, 2009, pp. 255-266.

* cited by examiner

US 11,349,736 B1

FLOW-BASED LATENCY MEASUREMENT FOR LOGICAL OVERLAY NETWORK TRAFFIC

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, VMs supported by different hosts may be deployed on the same logical overlay network, or different logical overlay networks. However, traffic over logical overlay networks may be susceptible to various performance issues, such as latency-related issues that affect the quality of packet flows among VMs.

DETAILED DESCRIPTION

Figure 1:
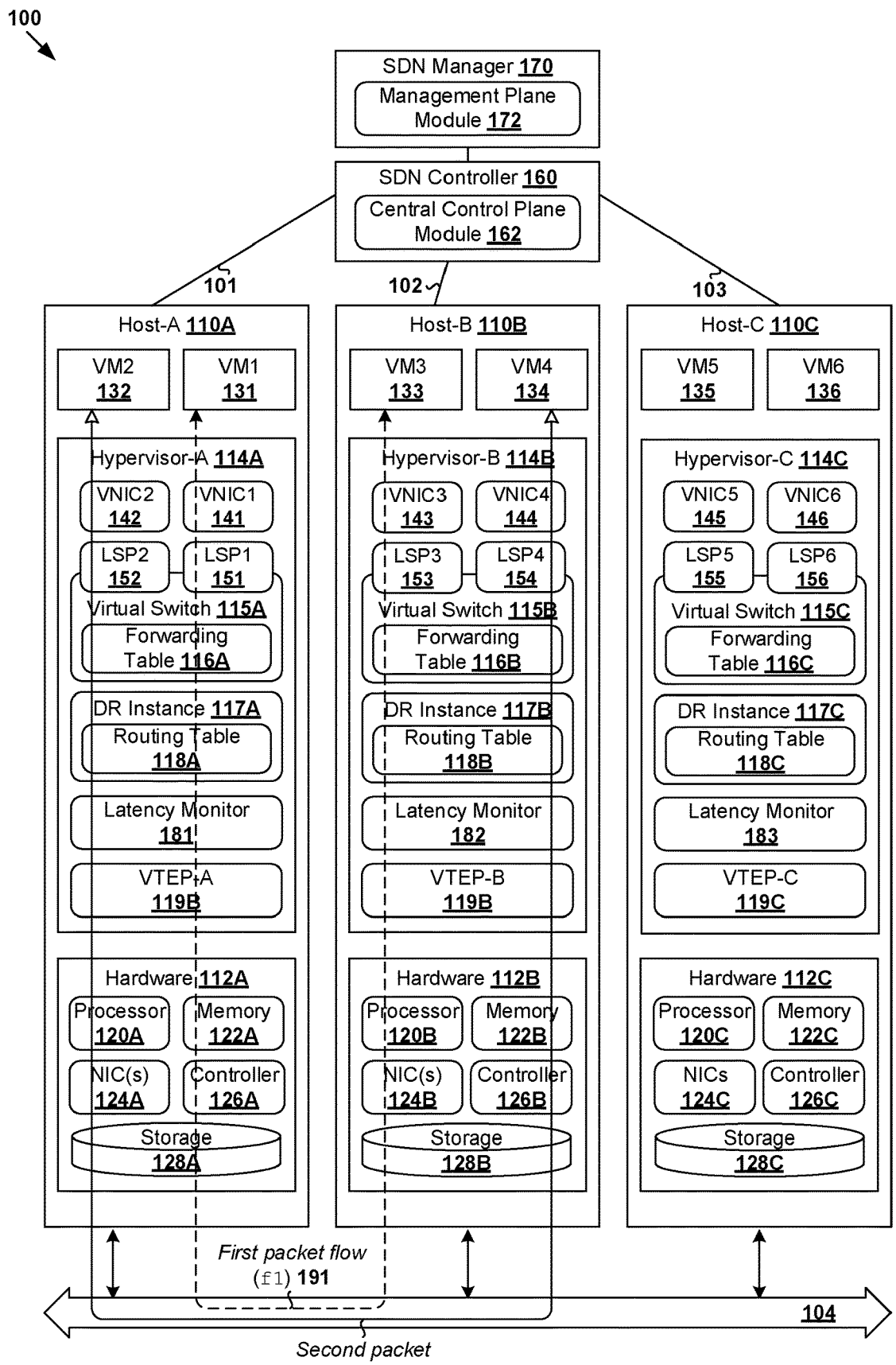
FIG. 1 is a schematic diagram illustrating an example software-defined networking (SDN) environment in which flow-based latency measurement for logical overlay network traffic may be performed.

According to examples of the present disclosure, latency measurement may be improved for logical overlay network traffic by measuring end-to-end latency at the granularity of a packet flow over a logical overlay tunnel. For example, to measure flow-based latency, a first computer system (e.g., first host) may generate and send a first encapsulated packet that includes first time information (e.g., timestamp(s) recorded at the first host) to a second computer system (e.g., second host) over a logical overlay tunnel. In response, the second computer system may generate and send a second encapsulated packet that includes second time information (e.g., timestamp(s) recorded at the second host) to the first computer system. This way, a flow-based latency measurement (i.e., latency associated with a particular packet flow) may be performed based on the first time information and second time information.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network performance will now be explained in more detail using FIG. 1, which is a schematic diagram illustrating example software-defined networking (SDN) environment 100 in which flow-based latency measurement for logical overlay network traffic may be performed. Depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (known as a "host computers", "host devices", "physical servers", "server systems", "transport nodes," etc.), each host supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine"

running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 160 are example network management entities in SDN environment 100. For example, SDN manager 170 may reside on a management plane (see module 172) and SDN controller 160 on a central control plane (see module 162). To send and receive the control information (e.g., configuration information), each host 110A/110B/110C may implement local control plane (LCP) agent (not shown) to interact with SDN controller 160. For example, control-plane channel 101/102/103 may be established between SDN controller 160 and host 110A/110B/110C using TCP over Secure Sockets Layer (SSL), etc. Management entity 160/170 may be implemented using physical machine(s), virtual machine(s), a combination thereof, etc. Hosts 110A-C may also maintain data-plane connectivity with each other via physical network 104.

Through virtualization of networking services, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. For example, tunnel encapsulation may be implemented according to a tunneling protocol to extend layer-2 segments across multiple hosts. The term "logical overlay tunnel" in relation to a logical overlay network may refer generally to a tunnel established between a pair of virtual tunnel endpoints (VTEPs) over physical network 104, over which respective hosts are in layer-3 connectivity with one another.

In the example in FIG. 1, hypervisor 114A/114B/114C may implement a virtual tunnel endpoint (VTEP) to encapsulate and decapsulate packets with an outer header (also known as a tunnel header) identifying a logical overlay network (e.g., VNI=5000) to facilitate communication over the logical overlay network. For example, hypervisor-A 114A implements first VTEP-A 119A associated with (IP address=IP-A, MAC address=MAC-A, VTEP label=VTEP-A), hypervisor-B 114B implements second VTEP-B 119B with (IP-B, MAC-B, VTEP-B) and hypervisor-C 114C implements third VTEP-C 119C with (IP-C, MAC-C, VTEP-C). Encapsulated packets may be sent via a logical overlay tunnel established between a pair of VTEPs over physical network 104. In practice, a particular host may support more than one VTEP.

Figure 2:
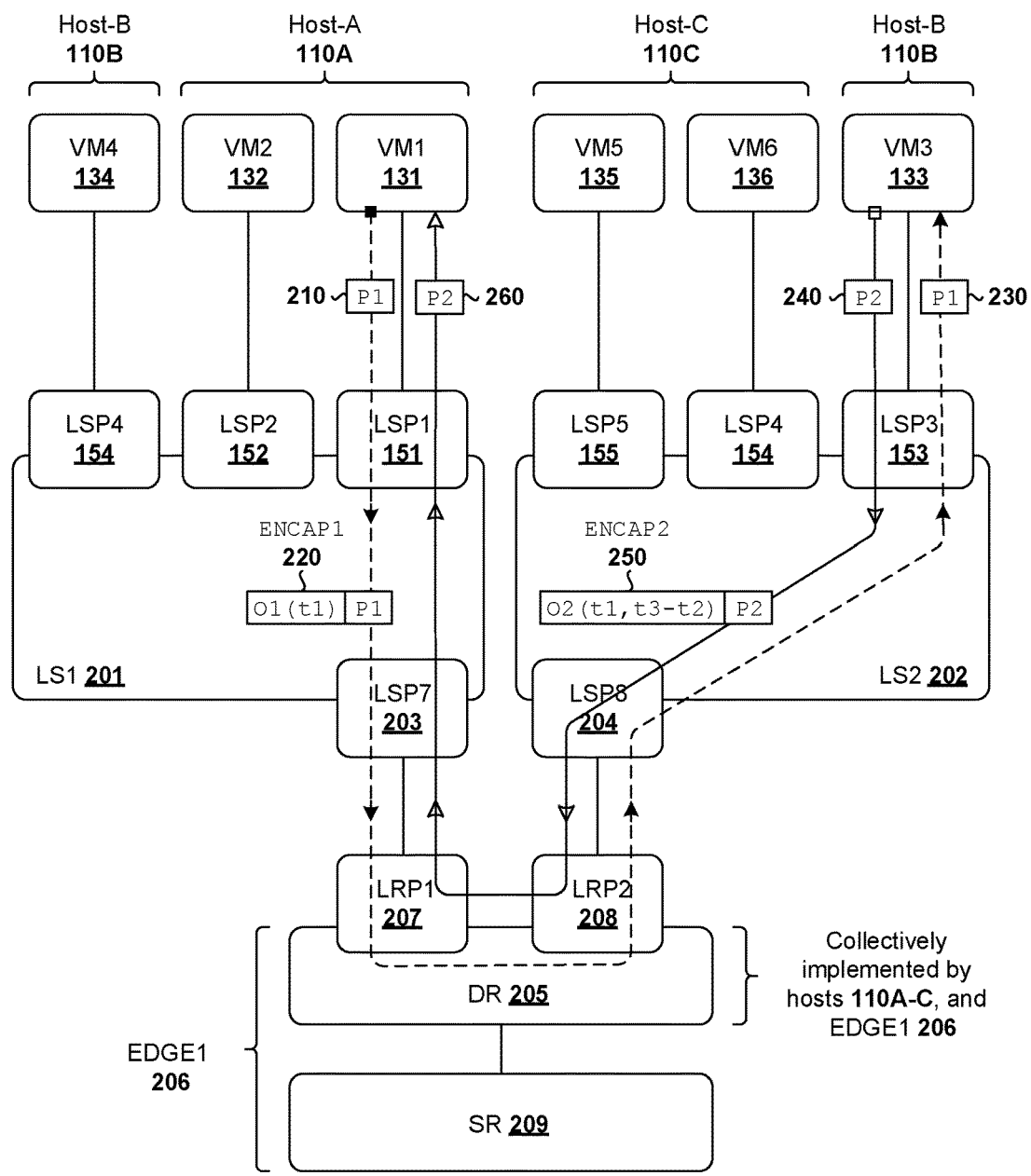
FIG. 2 is a schematic diagram illustrating an example management-plane view of logical overlay networks in the SDN environment in FIG. 1.

Some example logical overlay networks are shown in FIG. 2, which is a schematic diagram illustrating example management plane view 200 of SDN environment 100 in FIG. 1. Here, VM1 131, VM2 132 and VM4 134 are located on a first logical layer-2 segment associated with virtual network identifier (VNI)=5000 and connected to a first logical switch (see "LS1" 201). VM3 133, VM5 135 and VM6 136 are located on a second logical layer-2 segment associated with VNI=6000 and connected to a second logical switch (see "LS2" 202). With the growth of infrastructure-as-a-service (IaaS), logical overlay networks may be deployed to support multiple tenants. In this case, each logical overlay network may be designed to be an abstract representation of a tenant's network in SDN environment 100.

A logical DR (see "DR" 205) connects logical switches 201-202 to facilitate communication among VMs 131-136 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple transport nodes, such as using virtual switches 115A-C and represented internally using forwarding tables 116A-C. DR 205 may be implemented collectively by multiple transport nodes, such as using edge node 206 and hosts 110A-C. For example, DR 205 may be implemented using DR instances 117A-C and represented internally using routing tables 118A-C at respective hosts 110A-C.

Edge node 206 (labelled "EDGE1") may implement one or more logical DRs and logical service routers (SRs), such as DR 205 and SR 209 in FIG. 2. SR 209 may represent a centralized routing component that provides centralized stateful services to VMs 131-136, such as IP address assignment using dynamic host configuration protocol (DHCP), load balancing, network address translation (NAT), etc. EDGE1 206 may be implemented using VM(s) and/or physical machines ("bare metal machines"), and capable of performing functionalities of a switch, router (e.g., logical service router), bridge, gateway, edge appliance, or any combination thereof. In practice, EDGE1 206 may be deployed at the edge of a geographical site to facilitate north-south traffic to an external network, such as another data center at a different geographical site.

Depending on the desired implementation, a multi-tier topology may be used to isolate multiple tenants. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). In this case, a logical router may be categorized as one of the following types: TLR-DR, TLR-SR, PLR-DR and PLR-SR. Depending on the desired implementation, DR 205 and SR 209 may be connected via a transit logical switch (not shown in FIG. 2 for simplicity).

The virtualization of networking services generally provides improved flexibility, manageability and serviceability in relation to forwarding policy, performance and security. However, in practice, logical overlay networks are susceptible to various performance issues, which may affect the performance of applications supported by VMs 131-136. For example, some real-world applications may have relatively stringent requirement in relation to network latency, such as applications relating to autonomous driving, video streaming and e-commerce sales. For latency-sensitive traffic, high latency is undesirable because it affects the quality of the applications (e.g., timely delivery of streaming data), which in turn hinders user experience and possibly leads to business loss.

Conventionally, it is challenging to diagnose latency-related network issues in SDN environment 100. One conventional approach is to assess indirect indicators (e.g., CPU usage and network logs), which might be inefficient and lack responsiveness to real-time issues. To diagnose latency-related network issues for a particular packet flow, it is generally insufficient to measure the overall latency between a pair of hosts, such as host 110A and host-B 110B. In particular, for logical overlay network traffic, a particular logical overlay tunnel that is established between VTEP-A 119A and VTEP-B 119B may be used to transport a large number of packet flows. As such, different packet flows being forwarded over the same logical overlay tunnel may traverse different physical forwarding paths (e.g., formed by physical switches/routers) on physical network 104, which in turn affects their individual latency.

Flow-Based Latency Measurement

According to examples of the present disclosure, latency measurement may be improved for logical overlay network traffic by measuring end-to-end latency at the granularity of a packet flow over a logical overlay tunnel. As used herein, the term "flow-based" may refer generally to latency measurement for a particular packet flow, which may be characterized using any suitable packet tuple information. The term "end-to-end" may refer generally to latency measurement for a particular packet flow between a pair of endpoints, such as a pair of VMs in the example in FIG. 1. Examples of the present disclosure may be integrated with a network monitoring platform accessible by network administrators and developers to facilitate latency-related network diagnosis and troubleshooting.

As used herein, the term "logical overlay network traffic" may refer generally to encapsulated packet(s) associated with a packet flow between a pair of endpoints (e.g., VMs) that are connected via a logical overlay network that includes logical switch(es) and/or logical router(s). The pair of endpoints may be deployed on the same logical overlay network (e.g., VNI=5000) or different logical overlay networks (e.g., source VNI=5000 to destination VNI=6000). Throughout the present disclosure, various examples will be explained using host-A 110A as an example "first host" or "first computer system," host-B 110B as "second host" or "second computer system," source VM1 131/VM2 132 as "first virtualized computing instance," destination VM3 133/VM4 134 as "second virtualized computing instance," SDN controller 160 as "management entity," etc.

In the following, consider two packet flows between host-A 110A and host-B 110B. A first packet flow (see 191 in FIG. 1) is between a first pair of endpoints VM1 131 and VM3 133. A second packet flow (see 192 in FIG. 1) is between a second pair of endpoints VM2 132 and VM4 134. VMs 131-136 are associated with respective virtual machine interfaces (VIFs) in the form of VNICs 141-146 (or associated LSPs 151-156). For the first packet flow (denoted as f1), it is desirable to measure the end-to-end latency (denoted as L(f1)) between a first pair of endpoints: (a) VM1 131 with first VIF=VNIC1 141 and (b) VM3 133 with second VIF=VNIC3 143. For the second packet flow (denoted as f2), it is desirable to measure the end-to-end latency (denoted as L(f2)) between a second pair of endpoints: (a) VM2 132 with VIF=VNIC2 142 and (b) VM4 134 with VIF=VNIC4 134).

Although both packet flows 191-192 are being forwarded via the same logical overlay tunnel between VTEP-A 119A on host-A 110A and VTEP-B 119B on host-B 110B, the end-to-end latency of each packet flow may be different. The difference may be caused by various factors, such as different physical forwarding paths traversed by the packet flows, congestion state of physical switches and/or physical routers connecting hosts 110A-B on physical network 104, etc. Using examples of the present disclosure, time information may be injected into logical overlay network traffic to facilitate end-to-end, flow-based latency measurement.

Examples of the present disclosure should be contrasted against conventional approaches that rely on network utilities provided on a VM's guest OS. Using these network utilities, it is generally challenging to identify the contribution of network latency in a guest networking stack or virtual network infrastructure. Also, in real-world SDN environment 100, the owners of VMs 131-136 are different from the owners of the underlying network infrastructure. In this case, it is usually difficult (or sometimes impossible) for network infrastructure administrators to perform troubleshooting on VMs 131-136.

Figure 3:
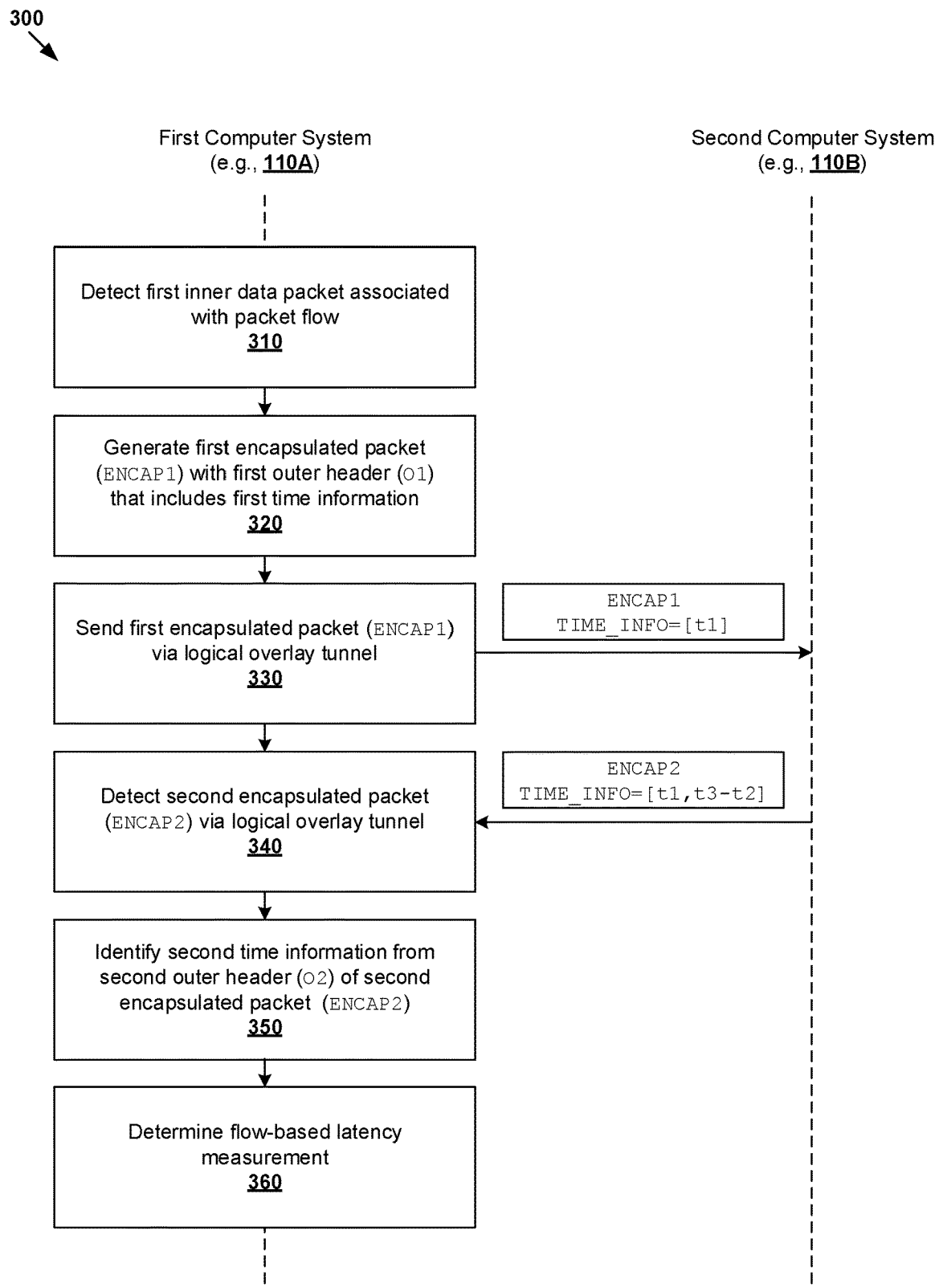
FIG. 3 is a flowchart of an example process for a first computer system to perform flow-based latency measurement for logical overlay network traffic.

In more detail, FIG. 3 is a flowchart of example process 300 for a computer system to perform flow-based latency measurement for logical overlay network traffic. Example process 300 may include one or more operations, functions, or actions illustrated by one or more blocks, such as 310 to 360. The various blocks may be combined into fewer blocks, divided into additional blocks, and/or eliminated depending on the desired implementation. In practice, example process 300 may be implemented by any suitable "computer system," such as physical host 110A/110B/110C using hypervisor 114A/114B/114C that supports latency monitor 181/182/183, etc. In practice, latency monitor 181/182/183 may include any suitable hardware and/or software-implemented processing component(s) along a datapath between a pair of endpoints. An example will be discussed below using FIG. 2 using the first packet flow between VM1 131 supported by host-A 110A and VM3 133 supported by host-B 110B.

At 310, 320 and 330 in FIG. 3, in response to detecting a first inner data packet (see "P1" 210 in FIG. 2) associated with a packet flow between VM1 131 and VM3 133, host-A 110A (e.g., latency monitor 181) may generate and send a first encapsulated packet (see "ENCAP1" 220) to host-B 110B via a logical overlay tunnel between VTEPs 119A-B. In the example in FIG. 2, the first encapsulated packet (see "ENCAP1" 220) may be generated by encapsulating the first inner data packet (see "P1" 210) with a first outer header (see "O1") that is addressed from host-A 110A to host-B 110B. To facilitate flow-based latency measurement, the first outer header (O1) may be injected with first time information associated with "P1" 210 at host-A 110A.

At 340 and 350 in FIG. 3, in response to detecting a second encapsulated packet (see "ENCAP2" 250) from host-B 110B responsive to the first encapsulated packet, host-A 110A may identify second time information from a second outer header (see "O2") of the second encapsulated packet. The second time information may be associated with the first inner data packet (see "P1" 230) and a second inner packet (see "P2" 240) at host-B 110B. Further, at 360, based on the first time information and the second time information, host-A 110A may determine a flow-based latency measurement associated with the packet flow.

Depending on the desired implementation, the flow-based latency L(f1) for the first packet flow (f1) may be determined based on any suitable latency measurement approach, such as by calculating L(f1)=d1−d2. In this example, a first duration (d1)=(t4−t1) may represent a time difference between a fourth timestamp (t4) and a first timestamp (t1) recorded by host-A 110A according to a first clock. A second duration (d2)=(t3−t2) may represent a time difference between a third timestamp (t3) and a second timestamp (t2) recorded by host-B 110B according to a second clock. It is not necessary for the first clock running on host-A 110A to synchronize with the second clock running on host-B 110B. In other words, inter-host clock synchronization (which may be difficult to achieve) is not required to implement the examples of the present disclosure.

As will be discussed using FIGS. 4-6, the first time information may specify the first timestamp (t1) associated with the detection of "P1" 210 at first VIF=VNIC1 141. The fourth timestamp (t4) may be associated with the detection of "P2" 260 at VNIC1 141 (or dropping thereof in the pseudo packet case in FIG. 6). The second time information may specify the second duration (d2=t3−t2) determined by host-B 110B. Alternatively, the second time information may specify both the second and third timestamps (t2, t3) for host-A 110A to calculate the second duration (d2) by host-A 110A. The second timestamp (t2) may be associated with the detection of "P1" 230 at second VIF=VNIC3 143 on host-B 110B. The third timestamp (t3) may be associated with the detection of "P2" 240 at VNIC3 143 (or generation thereof in the pseudo packet case in FIG. 6) on host-B 110B.

Depending on the desired implementation, encapsulated packets may be generated according to a tunneling protocol (e.g., GENEVE) associated with a logical overlay tunnel connecting first VTEP-A 119A supported by host-A 110A and second VTEP-B 119B supported by host-B 110B. The outer header (e.g., GENEVE header) may be addressed from host-A 110A to host-B 110B, particularly from source VTEP-A 119A (e.g., source IP=IP-A) to VTEP-B 119B (e.g., destination IP=IP-B). The "time information" may be injected or included in an option field in the outer header (e.g., GENEVE option field). Various examples will be discussed below with reference to FIG. 4, FIG. 5 (bidirectional traffic), FIG. 6 (unidirectional traffic) and FIG. 7 (intra-host).

First Packet Flow (Bidirectional)

Figure 4:
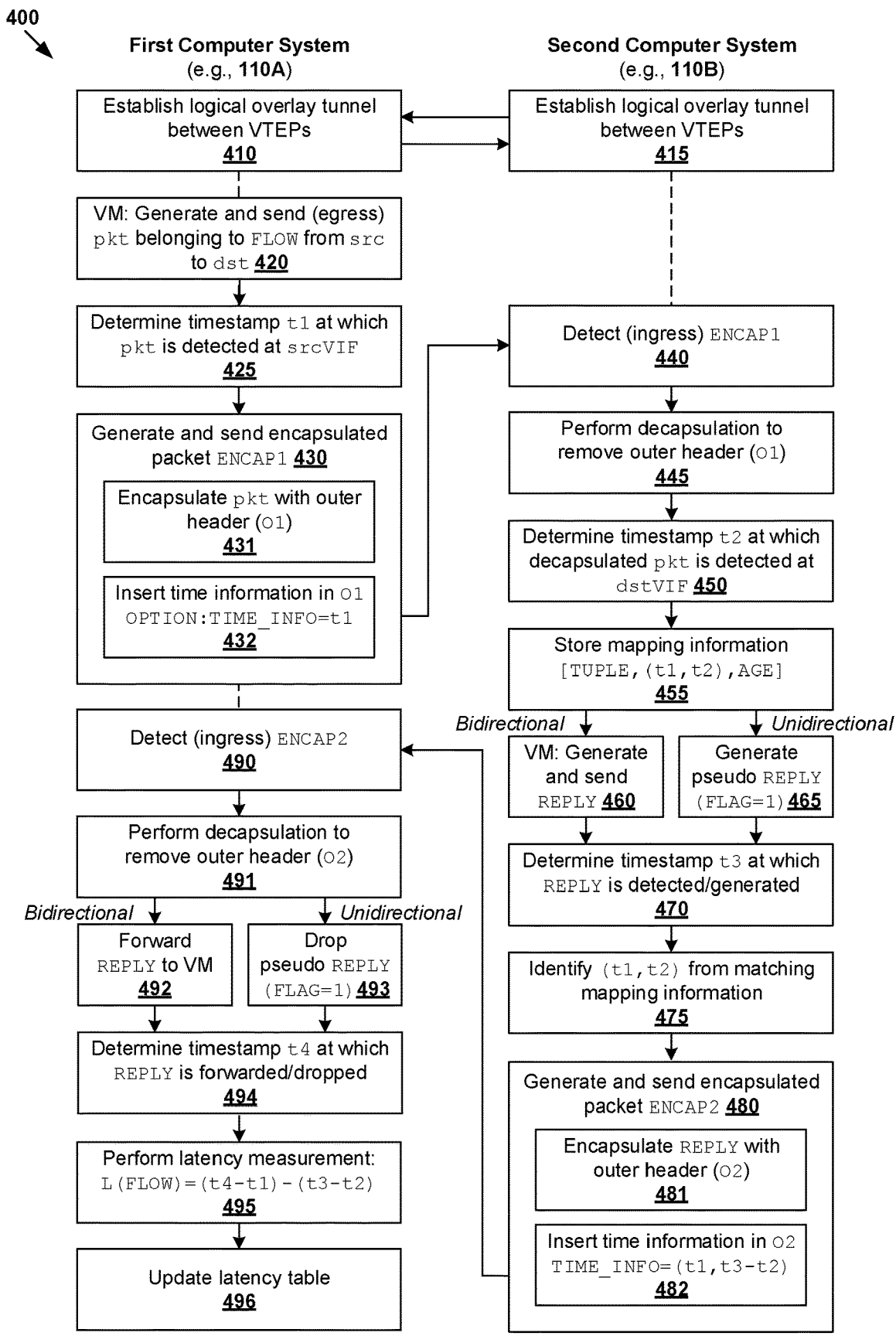
FIG. 4 is a flowchart of an example detailed process for computer systems to perform flow-based latency measurement for logical overlay network traffic.

FIG. 4 is a flowchart of example detailed process 400 of flow-based latency measurement for logical overlay network traffic. Example process 400 may include one or more operations, functions, or actions illustrated at 410 to 496. The various operations, functions or actions may be combined into fewer blocks, divided into additional blocks, and/or eliminated depending on the desired implementation. FIG. 4 will be explained using FIG. 5, which is a schematic diagram illustrating first example 500 of flow-based latency measurement for logical overlay network traffic. As mentioned above, the examples below may be implemented by hosts 110A-B using, for example, respective latency monitors 181-182.

(a) Logical Overlay Tunnels

Referring to FIG. 4 again, at 410-415, hosts 110A-B may establish logical overlay tunnels among respective VTEPs 119A-B (see FIG. 1) to facilitate logical overlay network traffic forwarding. One example tunneling protocol is GENEVE, which is used to establish logical overlay tunnels that act as backplanes among virtual switches 115A-B supported by respective hypervisors 114A-B. Example implementation details relating to GENEVE encapsulation may be found in a draft document entitled "Geneve: Generic Network Virtualization Encapsulation" (draft-ietf-nvo3-geneve-16) published by Internet Engineering Task Force (IETF). The document is incorporated herein by reference.

Figure 5:
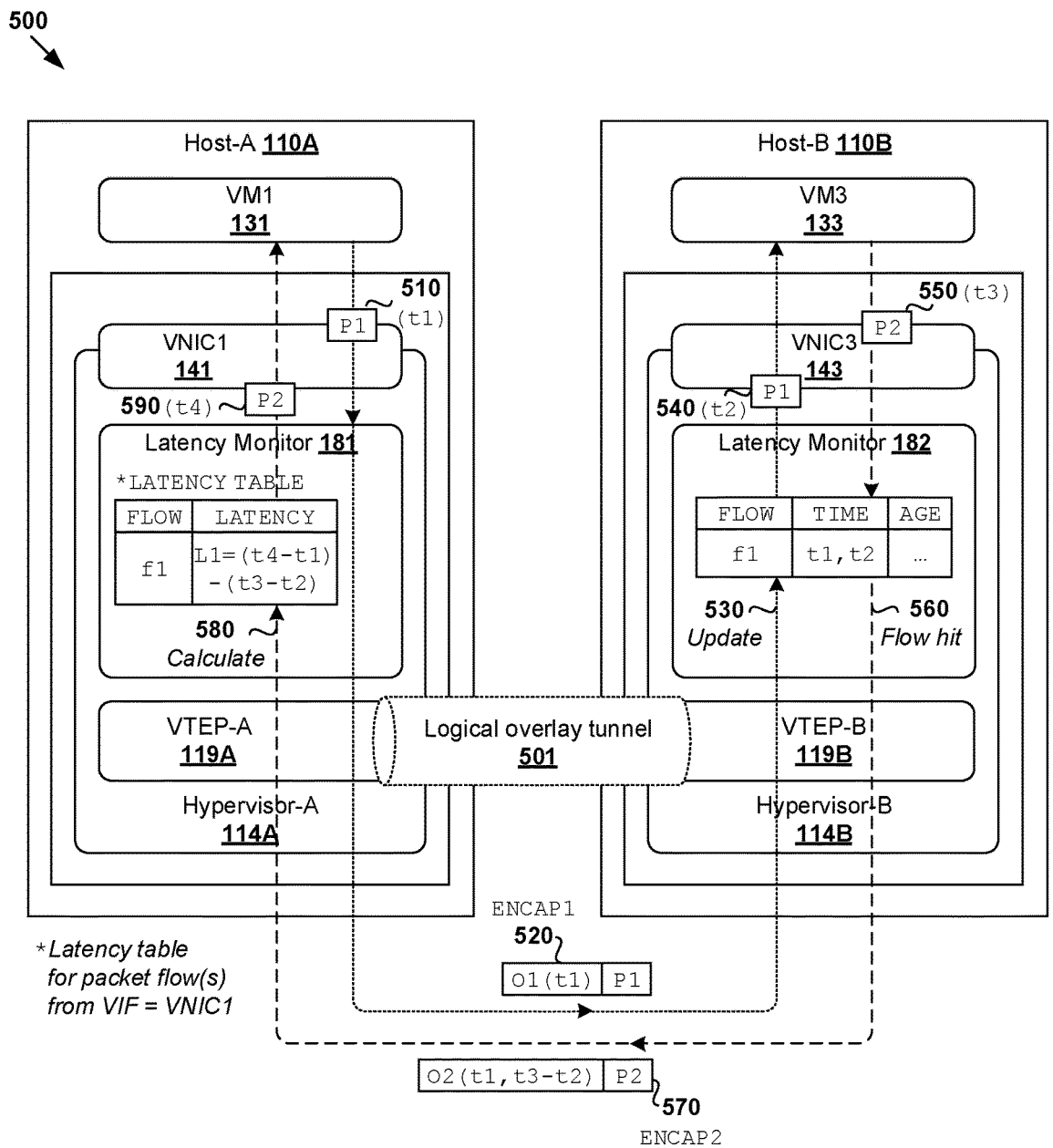
FIG. 5 is a schematic diagram illustrating a first example of flow-based latency measurement for logical overlay network traffic.

In the example in FIG. 5, a first logical overlay tunnel (see 501) may be established between VTEP-A 119A on host-A 110A and VTEP-B 119B on host-B 110B to facilitate multiple packet flows. First logical overlay tunnel 501 may be used to facilitate a first packet flow (f1) between VM1 131 and VM3 133, as well as a second packet flow (f2) between VM2 132 and VM4 134 (to be discussed using FIG. 6). A second logical overlay tunnel (not shown) may be established between VTEP-A 119A and VTEP-C 119C. A third logical overlay tunnel (not shown) may be established between VTEP-B 119B and VTEP-C 119C. The tunnels may be established over physical network 104 using any suitable transport protocol, such as UDP, etc.

(b) Forward Path (Towards VM3 133)

At 510 in FIG. 5, in response to detecting a first inner data packet (see "P1" 510) with an inner header that is addressed from VM1 131 to VM3 133, host-A 110A may determine first timestamp=t1 associated with the detection of "P1" 510. For example, the first timestamp may indicate a time point at which "P1" 510 is detected via first VIF=VNIC1 141 (or LSP1 151) according to a first local clock on host-A 110A. In practice, when data packet "P1" 510 is being forwarded along a datapath supported by hypervisor-A 114A, first timestamp=t1 may be stored as metadata associated with "P1" 510. When "P1" 510 is on the wire (via logical overlay tunnel 501), first timestamp=t1 may be stored in a GENEVE option field. See 420 and 425 in FIG. 4.

At 520 in FIG. 5, host-A 110A may generate and send a first encapsulated packet (see "ENCAP1" 520) towards host-B 110B via logical overlay tunnel 501. This may involve encapsulating "P1" 510 with an outer header (see "O1") specifying (source VTEP IP address=IP-A, destination VTEP IP address=IP-B) associated with respective source VTEP-A 119A and destination VTEP-B 119B. Further, first timestamp=t1 may be injected into the outer header of "ENCAP1" 520, such as a GENEVE option data field in a GENEVE header. See 430, 431 and 432 in FIG. 4.

In response to receiving "ENCAP1" 520 via logical overlay tunnel 501, host-B 110B may perform decapsulation to remove the outer header (O1) and determine a second timestamp=t2 associated with "P1" 530 according to a second clock running on host-B 110B. Second timestamp=t2 may indicate a time point at which decapsulated "P1" 540 is detected at second VIF=VNIC3 143 (or LSP3 153) to which VM3 133 is connected. See 450 and 455 in FIG. 4.

At 530-540 in FIG. 5, host-B 110B may store mapping information associated with the first packet flow (f1), and forward decapsulated "P1" 540 (same as 510) towards destination VM3 133 via second VIF=VNIC3 143 connected to VM3 133. The mapping information may be stored in a roundtrip table maintained by latency monitor 182 on host-B 110B. The mapping information may include any suitable tuple information that is associated with the first packet flow (f1) and extractable from an inner header of decapsulated "P1" 540.

Example tuple information may include source IP address (INNER_SIP)=IP-VM1, destination IP address (INNER_DIP)=IP-VM3, source port number (INNER_SPN)=S1, destination port number (INNER_DPN)=443, protocol (INNER_PRO)=TCP (e.g., HTTPS service). The tuple information may be stored in association with (t1, t2). Here, the first timestamp=t1 is extractable from the outer header (O2) of "ENCAP1" 520. The second timestamp=t2 is recorded by host-B 110B according to block 450 in FIG. 4. Host-B 110B may also set a predetermined aging duration (to be discussed using FIG. 6) for mapping information in the roundtrip table.

(c) Reverse Path (Towards VM1 131)

At 550-560 in FIG. 5, in the case of bidirectional traffic, VM3 133 may generate and send a reply packet (see "P2" 550) that is addressed from VM3 133 to VM1 131. In response to detecting reply packet "P2" 550, host-B 110B may determine that latency measurement is required based on a "flow hit" event, i.e., a matching entry specifying tuple information associated with "P2" 550 is found in the roundtrip table. In this case, host-B 110B may record a third timestamp=t3 indicating a time point at which "P2" 550 is detected via VNIC3 133 (or LSP3 153). Upon the "flow hit" event, the matching entry will also be removed from the roundtrip table. See 460, 470 and 475 in FIG. 4. Note that block 465 will be discussed using FIG. 6.

At 570 in FIG. 5, host-B 110B may generate and send a second encapsulated packet (see "ENCAP2" 570) towards host-A 110A via logical overlay tunnel 501. This may involve encapsulating "P2" 550 generated by VM3 133 with an outer header (see "O2") specifying (source VTEP IP address=IP-B, destination VTEP IP address=IP-A) associated with respective VTEP-A 119A and VTEP-B 119B. Further, second time information in the form of time duration d2=(t3−t2) may be injected or included in the outer header of "ENCAP2" 570, such as a GENEVE option data field. See 480, 481 and 482 in FIG. 4.

At 580-590 in FIG. 5, in response to detecting "ENCAP2" 570 from host-B 110B via logical overlay tunnel 501, host-A 110A may perform decapsulation and forward the decapsulated inner packet (see "P2" 590) to VM1 131 via VNIC1 141. Host-A 110A may also record a fourth timestamp=t4 associated with the detection (or arrival) of "P2" 590 at VNIC1 141 and perform flow-based latency measurement. See 490, 491, 492, 494 and 495 in FIG. 4.

In the example in FIG. 5, the end-to-end, flow-based latency (denoted as L (f1) or L1) associated with the first packet flow (f1) between VM1 131 and VM3 133 may be calculated as follows:

$$L(f1)=d1-d2, \text{ where } d1=(t4-t1) \text{ and } d2=(t3-t2).$$

In the above example, the first duration (d1) may represent a time difference between a fourth timestamp (t4) and a first timestamp (t1) recorded by host-A 110A according to a first clock. In more detail, the first duration (d1) may represent the time that has elapsed between (a) a time point (as recorded using t1) at which "P1" 510 is detected at VNIC1 141 on the forward path from VM1 131 towards VM3 133 and (b) a subsequent time point (as recorded using t4) at which "P2" 590 is detected at VNIC1 141 on the reverse path from VM3 133 towards VM1 131.

To determine roundtrip latency, the second duration (d2) may be deducted from the first duration (d1). The second duration (d2)=(t3−t2) may represent a time difference between a third timestamp (t3) and a second timestamp (t2) recorded by host-B 110B according to a second clock. In more detail, the second duration (d2) may represent the time that has elapsed between (a) a time point (as recorded using t2) at which "P1" 540 is detected at VNIC3 143 on the forward path from VM1 131 towards VM3 133 and (b) a subsequent time point (as recorded using t3) at which "P2" 550 is detected at VNIC3 143 on the reverse path from VM3 133 towards VM1 131.

By measuring flow-based latency based on time durations (d1, d2), any inaccuracy resulting from the lack of clock synchronization between hosts 110A-B may be reduced. This is because the first duration (d1) is calculated based on one set of timestamps (a, t4) recorded using the same clock on host-A 110A. Similarly, the second duration (d2) is calculated based on another set of timestamps (t2, t3) recorded using the same clock on host-B 110B. To facilitate network issue diagnosis and troubleshooting, host-A 110A may generate mapping information by associating latency L(f1)=d1−d2 with tuple information of the first packet flow (f1) for logical overlay traffic originating from first VIF=VNIC1 141. In practice, the latency table provides a mapping from flow entry to roundtrip latency for traffic originating from a particular VIF connected to a VM. The mapping information may be stored in a latency table accessible by latency monitor 181. See also 496 in FIG. 4.

Second Packet Flow (Unidirectional)

In the example using FIG. 5, the second packet flow between VM1 131 and VM3 133 is bidirectional. In practice, however, some packet flows are unidirectional in that the recipient may not respond with any packets at all. In more detail, FIG. 6 is a schematic diagram illustrating second example 600 of flow-based latency measurement for logical overlay network traffic. Here, a second packet flow (f2) between VM2 132 and VM4 134 may be unidirectional, such as VM4 134 receiving voice or video streaming data from streaming server VM2 132. For unidirectional packet flows, flow-based latency measurement may be performed based on pseudo packets on the reverse path. See 465 and 493 in FIG. 4.

(a) Forward Path (Towards VM4 134)

Figure 6:
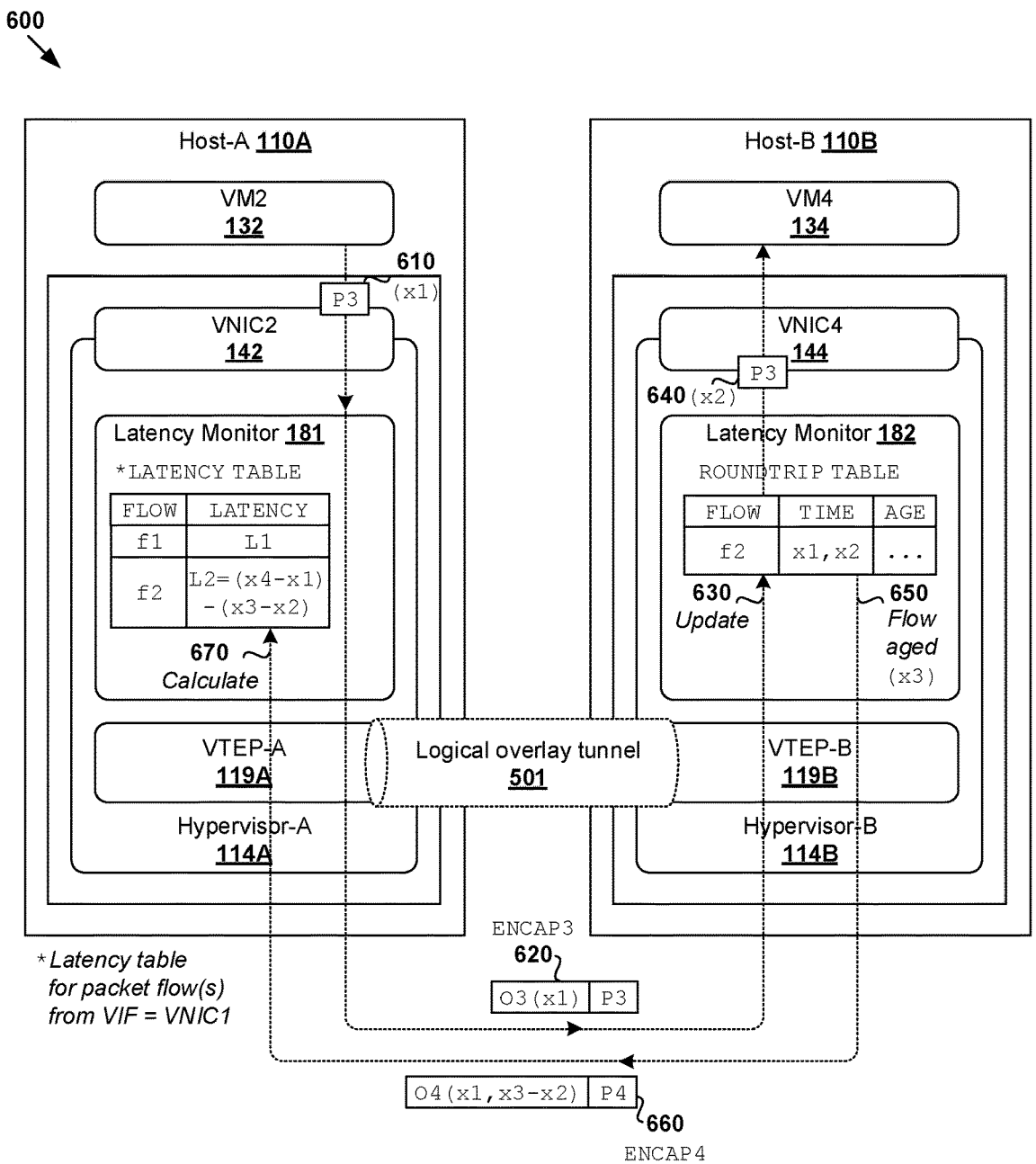
FIG. 6 is a schematic diagram illustrating a second example of flow-based latency measurement for logical overlay network traffic.

At 610-620 in FIG. 6, in response to detecting an inner data packet (see "P3" 610) with an inner header that is addressed from VM2 132 to VM4 134, host-A 110A may generate and send a first encapsulated packet (see "ENCAP3" 620) towards host-B 110B via logical overlay tunnel 501. This may involve encapsulating "P3" 610 with an outer header (see "O3") specifying (source VTEP IP address=IP-A, destination VTEP IP address=IP-B). The outer header may be injected with first time information in the form of a first timestamp=x1 associated with the detection of "P3" 610 at VNIC2 142.

At 630-640 in FIG. 6, host-B 110B may store mapping information associated with the second packet flow (f2) and forward decapsulated "P3" 640 (same as 610) towards destination VM4 134 via VNIC4 144. Similar to the example in FIG. 5, the mapping information may be stored in a roundtrip table maintained by latency monitor 182 on host-B 110B. In the example in FIG. 6, the mapping information may include tuple information such as INNER_SIP=IP-VM2, INNER_DIP=IP-VM4, INNER_SPN=S2, INNER_DPN=D2 and INNER_PRO=UDP. The tuple information may be stored in association with (x1, x2), where second timestamp=x2 is associated with the detection of received "P3" 640 at VNIC4 144. In practice, note that a packet flow may represent an abstraction for a group or class of packets using tuple information. The abstraction may vary with respect to specific applications.

(b) Reverse Path (Towards VM2 132)

In the case of unidirectional traffic, VM4 134 will not respond with any reply packet. To facilitate latency measurement, host-B 110B may set a predetermined aging duration (τ) for mapping information associated with the second packet flow (f2) in the roundtrip table. Once the aging duration (τ) has elapsed, pseudo reply packets may be generated and sent towards host-A 110A. In practice, the aging duration (τ) is a configurable parameter. As the aging duration (τ) increases, a larger amount of memory is required to cache or store mapping information associated with various packet flows.

At 650-660 in FIG. 6, in response to detection of a "flow aged" event (i.e., aging duration has elapsed), hypervisor-B 110B (e.g., using latency monitor 182) may generate and send a second encapsulated packet (see "ENCAP4" 660) towards host-A 110A. "ENCAP4" 660 may be generated by encapsulating a pseudo packet (see "P4") with an outer header (see "O4"). Based on tuple information identifiable from the aged entry, pseudo packet "P4" may be addressed from source IP-VM4 associated with VM4 134 to destination IP-VM2 associated with VM2 132.

The outer header (O4) of may be injected with second time information in the form of (x3−x2), where third timestamp=x3 is associated with the generation of "P4" 660 at host-B 110B. The outer header (O4) may further include first time information in the form of first timestamp=x1 recorded by host-A 110A. Depending on the desired implementation, the outer header (O4) may further include a flag (PSEUDO_FLAG)=1 indicating that "ENCAP4" 660 includes a pseudo packet that does not have to be delivered to VM2 132. Note that upon the "flow aged" event, the matching entry will also be removed from the roundtrip table.

At 670 in FIG. 6, in response to detecting "ENCAP4" 660 from host-B 110B via logical overlay tunnel 501, host-A 110A may perform decapsulation and drop pseudo packet "P4" (i.e., not delivered to VM2 132) based on PSEUDO_FLAG=1 in the outer header (O4) of "ENCAP4" 660. Host-A 110A may also record a fourth timestamp=t4 associated with arrival (or subsequent dropping) of pseudo packet "P4."

The end-to-end, flow-based latency (denoted as L(f2) or L2) associated with the second packet flow (f2) between VM2 132 and VM4 134 may be calculated as:

$L(f2)=d1-d2$, where $d1=(x4-x1)$ and $d2=(x3-x2)$.

Similar to the example in FIG. 5, the first duration (d1) may represent the time elapsed between (a) a time point (as recorded using x1) at which "P3" 610 is detected at VNIC2 142 on the forward path from VM2 132 towards VM4 134 and (b) a subsequent time point (as recorded using x4) at which pseudo packet "P4" is received or dropped by host-A 110A. The second duration (d2) may represent the time elapsed between (a) a time point (as recorded using x2) at which "P3" 640 is detected at VNIC4 144 on the forward path and (b) a subsequent time point (as recorded using x3) at which pseudo packet "P4" is generated by host-B 110B.

To facilitate network issue diagnosis and troubleshooting, host-A 110A may generate mapping information by associating latency L(f2) with tuple information of the second packet flow (f2) for logical overlay traffic originating from first VIF=VNIC1 141. In this case, a latency table accessible by latency monitor 181 may include latency information associated with multiple packet flows, such as L(f1) and L(f2) at a per-flow granularity. Latency information consumers (e.g., network administrators, developers) may then query the latency table to derive any suitable statistical information, such as average latency value, minimum/maximum latency value, histogram, etc.

Depending on the desired implementation, host-A 110A may perform any suitable action(s) based on flow-based latency information. In a first example, host-A 110A may monitor latency values (e.g., (f1) and/or L(f2)) and generate alarm(s) in response to detecting a predetermined event (e.g., maximum threshold exceeded). This improves the efficiency of network diagnosis and troubleshooting by helping latency data consumers to identify latency-related issues relatively quickly. In a second example, host-A 110A may perform adaptive path selection based on the latency values, such as using load balancing and/or teaming algorithm(s) to select relatively low-latency physical forwarding path for latency-sensitive logical overlay network traffic. In a third example, host-A 110A may implement congestion control (e.g., in TCP/IP stack) for latency-oriented congestion control.

In practice, it is not necessary to perform the examples explained using FIGS. 4-6 for each and every packet of a packet flow. Using a packet sampling approach, flow-based latency measurement may be performed on packets that are sampled according to a latency sampling rate. This parameter may be configured to control the ratio of packets to be sampled, such as based on packet number, or time interval. The latency sampling rate may be configured to manage the overhead on the overall datapath performance.

It should be understood that examples of the present disclosure may be implemented for various types of packet flows using any suitable protocol, including but not limited to TCP, UDP, Internet Control Message Protocol (ICMP), etc. For inter-host, end-to-end latency measurement, clock synchronization is not required between hosts 110A-B. Examples of the present disclosure may leverage existing data traffic to measure roundtrip latency with relatively low impact on the overall throughput of the datapath. Further, (expensive) hardware changes are not required on hosts 110A-C to implement examples of the present disclosure.

Intra-Host Traffic

Examples of the present disclosure may be implemented for intra-host traffic. In particular, latency monitor 181 may be further configured to determine an intra-host flow-based latency measurement associated with an intra-host packet flow between a pair of VMs supported by host-A 110A. Further, mapping information associating (a) the intra-host flow-based latency measurement with (b) tuple information associated with the intra-host packet flow may be generated and stored. An example will be described using FIG. 7, which is a schematic diagram illustrating third example 700 of flow-based latency measurement for logical overlay network traffic. In this case, latency measurement may be performed for an intra-host packet flow (f3) between VM1 131 ("first virtualized computing instance") and VM2 132 ("third virtualized computing instance") that are both supported by host-A 110A. As such, packet encapsulation is not required. Using the example logical view in FIG. 2, VM1 131 and VM2 132 may be connected via logical switch LS1 201.

Figure 7:
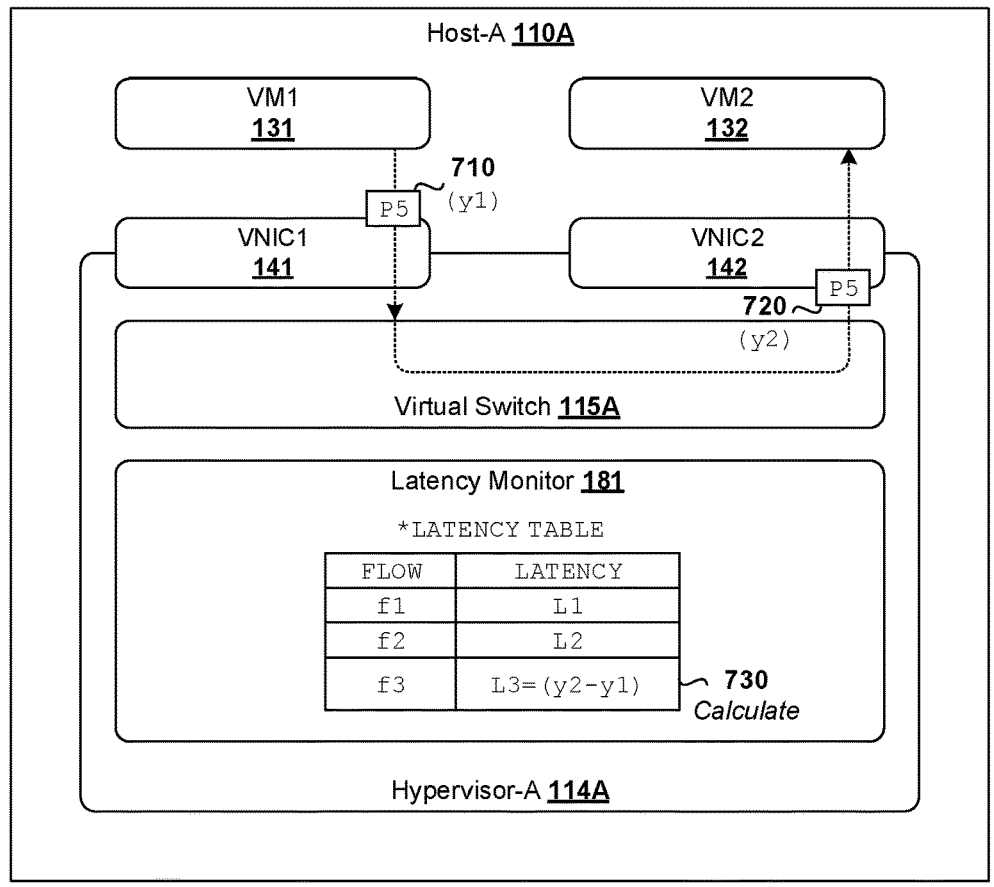
FIG. 7 is a schematic diagram illustrating a third example of flow-based latency measurement for logical overlay network traffic.

In more detail, at 710 in FIG. 7, in response to detecting a data packet (see "P5" 710) with an inner header that is addressed from VM1 131 to VM2 132, latency monitor 181 on host-A 110A may determine first timestamp=y1 indicating a time point at which "P5" 710 is detected via source VIF=VNIC1 141 (or LSP1 151) according to a first local clock on host-A 110A. Since both the source and destination are on the same host, virtual switch 115A may forward "P5" 710 towards destination VIF=VNIC2 142. At 720, latency monitor 181 may determine second timestamp=y2 indicating a time point at which "P5" 710/720 is detected via second VIF=VNIC2 142 (or LSP2 152) according to the same local clock on host-A 110A.

At 730 in FIG. 7, the end-to-end, intra-host flow-based latency (denoted as L(f3) or L3) associated with the third packet flow (f3) between VM1 131 and VM2 132 may be calculated as: L(f3)=y2−y1, which is the difference between a time point at which "P5" 710 is detected at source VIF=VNIC1 141 and a subsequent time point at which "P5" 710/720 is detected at destination VIF=VNIC2 142. The latency table storing flow-based latency measurement for traffic originating from VNIC1 141 may be updated to include mapping information that associates (a) the intra-host latency measurement L(f3) and (b) tuple information associated with intra-host packet flow f3 for the example in FIG. 7.

Compared to the roundtrip latency (e.g., L1, L2) for inter-host traffic in FIGS. 4-5, it should be noted that L3 may represent the one-way latency for intra-host traffic between VM1 131 and VM2 132. Similar to the examples in FIGS. 5-6, flow-based latency measurements may be exported for network diagnosis and troubleshooting purposes, especially for latency-related network issues. In practice, a similar latency table may be generated for each VIF (e.g., VNICs 141-146) for traffic originating from a VM connected to that VIF.

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

For the container case, privileged containers may experience the security risks discussed using FIG. 1. For example, user identifier (UID) 0 in a container may behave the same in that container as it does on a computer system supporting the container. In practice, privileged containers are generally difficult to secure. Using examples of the present disclosure, authentication information may be generated and included in encapsulated packets having respective inner packets from a container associated with a trusted zone. Various examples discussed using FIG. 1 to FIG. 7 are also applicable here and will not be repeated for brevity.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first computer system to perform flow-based latency measurement for logical overlay network traffic, wherein the method comprises:
   in response to detecting, via a virtual network interface controller (VNIC) associated with a first virtualized computing instance supported by the first computer system, a first inner data packet associated with a packet flow between the first virtualized computing instance supported by the first computer system and a second virtualized computing instance supported by a second computer system,
      generating a first encapsulated packet by encapsulating the first inner data packet with a first outer header that includes first time information associated with the first inner data packet at the first computer system; and
      sending the first encapsulated packet via a logical overlay tunnel towards the second computer system to cause the second computer system to respond with a second encapsulated packet; and
   in response to detecting, from the second computer system via the logical overlay tunnel, the second encapsulated packet that includes a second inner packet and a second outer header,
      identifying, from the second outer header, second time information associated with the first inner data packet and the second inner packet at the second computer system; and
      based on the first time information and the second time information, determining a flow-based latency measurement associated with the packet flow.

2. The method of claim 1, wherein the method further comprises:
   generating and storing mapping information associating (a) the flow-based latency measurement with (b) tuple information associated with the packet flow; and
   based on the mapping information, performing an action to facilitate latency-based network diagnosis and troubleshooting.

3. The method of claim 1, wherein generating the first encapsulated packet comprises:
   injecting the first outer header with the first time information specifying a first timestamp (t1) associated with the detection of the first inner packet at a first virtual interface connected to the first virtualized computing instance.

4. The method of claim 3, wherein determining the flow-based latency measurement associated with the packet flow comprises:
   determining a first duration (d1) between the first timestamp (t1) and a fourth timestamp (t4) associated with handling of the second inner packet at the first computer system.

5. The method of claim 4, wherein the method further comprises:
   in response to determination that the second inner packet is a not pseudo packet, forwarding the second inner packet towards the first virtualized computing instance via the first virtual interface and recording the fourth timestamp (t4) that is associated with detection of the second inner packet at the first virtual interface;
   but otherwise, dropping the second inner packet, being a pseudo packet, and recording the fourth timestamp (t4) that is associated with the drop of the second inner packet.

6. The method of claim 4, wherein determining the flow-based latency measurement associated with the packet flow comprises:
   based on the second time information, identifying a second duration (d2) between (i) a second timestamp (t2) associated with detection of the first inner packet at a second virtual interface connected to the second virtualized computing instance; and (ii) a third timestamp (t3) associated with detection or injection of the second inner packet at the second virtual interface; and
   determining the flow-based latency measurement based on the first duration (d1) and the second duration (d2), wherein the first timestamp (t1) and the fourth timestamp (t4) are recorded based on a first clock that is not synchronized with a second clock based on which the second timestamp (t2) and the third timestamp (t3) are recorded.

7. The method of claim 1, wherein the method further comprises:
   determining an intra-host flow-based latency measurement associated with an intra-host packet flow between the first virtualized computing instance and a third virtualized computing instance that are both supported by the first computer system; and
   generating and storing mapping information associating (a) the intra-host flow-based latency measurement with (b) tuple information associated with the intra-host packet flow.

8. A non-transitory computer-readable storage medium that includes a set of instructions which, in response to execution by a processor of a first computer system, cause the processor to perform a method of flow-based latency measurement, wherein the method comprises:
   in response to detecting, via a virtual network interface controller (VNIC) associated with a first virtualized computing instance supported by the first computer system, a first inner data packet associated with a packet flow between the first virtualized computing instance supported by the first computer system and a second virtualized computing instance supported by a second computer system, generating a first encapsulated packet by encapsulating the first inner data packet with a first outer header that includes first time information associated with the first inner data packet at the first computer system; and sending the first encapsulated packet via a logical overlay tunnel towards the second computer system to cause the second computer system to respond with a second encapsulated packet; and in response to detecting, from the second computer system via the logical overlay tunnel, the second encapsulated packet that includes a second inner packet and a second outer header, identifying, from the second outer header, second time information associated with the first inner data packet and the second inner packet at the second computer system; and based on the first time information and the second time information, determining a flow-based latency measurement associated with the packet flow.

9. The non-transitory computer-readable storage medium of claim 8, wherein the method further comprises:

generating and storing mapping information associating (a) the flow-based latency measurement with (b) tuple information associated with the packet flow; and based on the mapping information, performing an action to facilitate latency-based network diagnosis and troubleshooting.

10. The non-transitory computer-readable storage medium of claim 8, wherein generating the first encapsulated packet comprises:

injecting the first outer header with the first time information specifying a first timestamp (t1) associated with the detection of the first inner packet at a first virtual interface connected to the first virtualized computing instance.

11. The non-transitory computer-readable storage medium of claim 10, wherein determining the flow-based latency measurement associated with the packet flow comprises:

determining a first duration (d1) between the first timestamp (t1) and a fourth timestamp (t4) associated with handling of the second inner packet at the first computer system.

12. The non-transitory computer-readable storage medium of claim 11, wherein the method further comprises:

in response to determination that the second inner packet is a not pseudo packet, forwarding the second inner packet towards the first virtualized computing instance via the first virtual interface and recording the fourth timestamp (t4) that is associated with detection of the second inner packet at the first virtual interface;

but otherwise, dropping the second inner packet, being a pseudo packet, and recording the fourth timestamp (t4) that is associated with the drop of the second inner packet.

13. The non-transitory computer-readable storage medium of claim 11, wherein determining the flow-based latency measurement associated with the packet flow comprises:

based on the second time information, identifying a second duration (d2) between (i) a second timestamp (t2) associated with detection of the first inner packet at a second virtual interface connected to the second virtualized computing instance; and (ii) a third timestamp (t3) associated with detection or injection of the second inner packet at the second virtual interface; and determining the flow-based latency measurement based on the first duration (d1) and the second duration (d2), wherein the first timestamp (t1) and the fourth timestamp (t4) are recorded based on a first clock that is not synchronized with a second clock based on which the second timestamp (t2) and the third timestamp (t3) are recorded.

14. The non-transitory computer-readable storage medium of claim 8, wherein the method further comprises:

determining an intra-host flow-based latency measurement associated with an intra-host packet flow between the first virtualized computing instance and a third virtualized computing instance that are both supported by the first computer system; and generating and storing mapping information associating (a) the intra-host flow-based latency measurement with (b) tuple information associated with the intra-host packet flow.

15. A computer system, being a first computer system, comprising:

a virtual network interface controller (VNIC) associated with a first virtualized computing instance supported by the first computer system;

a first virtual tunnel endpoint (VTEP) to establish a logical overlay tunnel with a second VTEP of a second computer system that supports a second virtualized computing instance; and a processor configured to operate a latency monitor to:

in response to detecting, via the VNIC, a first inner data packet associated with a packet flow between the first virtualized computing instance and the second virtualized computing instance, generate a first encapsulated packet by encapsulating the first inner data packet with a first outer header that includes first time information associated with the first inner data packet at the first computer system; and send the first encapsulated packet via the logical overlay tunnel towards the second computer system to cause the second computer system to respond with a second encapsulated packet; and in response to detecting, from the second computer system via the logical overlay tunnel, the second encapsulated packet that includes a second inner packet and a second outer header, identify, from the second outer header, second time information associated with the first inner data packet and the second inner packet at the second computer system; and based on the first time information and the second time information, determine a flow-based latency measurement associated with the packet flow between the first virtualized computing instance and the second virtualized computing instance.

16. The computer system of claim 15, wherein the latency monitor is further to:

generate and store mapping information associating (a) the flow-based latency measurement with (b) tuple information associated with the packet flow; and based on the mapping information, perform an action to facilitate latency-based network diagnosis and troubleshooting.

17. The computer system of claim 15, wherein generating the first encapsulated packet comprises the latency monitor performing the following:

inject the first outer header with the first time information specifying a first timestamp (t1) associated with the detection of the first inner packet at a first virtual interface connected to the first virtualized computing instance.

18. The computer system of claim 17, wherein determining the flow-based latency measurement associated with the packet flow comprises the latency monitor performing the following:

determine a first duration (d1) between the first timestamp (t1) and a fourth timestamp (t4) associated with handling of the second inner packet at the first computer system.

19. The computer system of claim 18, wherein the latency monitor is further to:

in response to determination that the second inner packet is a not pseudo packet, forward the second inner packet towards the first virtualized computing instance via the first virtual interface and recording the fourth timestamp (t4) that is associated with detection of the second inner packet at the first virtual interface;

but otherwise, drop the second inner packet, being a pseudo packet, and recording the fourth timestamp (t4) that is associated with the drop.

20. The computer system of claim 18, wherein determining the flow-based latency measurement associated with the packet flow comprises the latency monitor performing the following:

based on the second time information, identify a second duration (d2) between (i) a second timestamp (t2) associated with detection of the first inner packet at a second virtual interface connected to the second virtualized computing instance; and (ii) a third timestamp (t3) associated with detection or injection of the second inner packet at the second virtual interface; and determine the flow-based latency measurement based on the first duration (d1) and the second duration (d2), wherein the first timestamp (t1) and the fourth timestamp (t4) are recorded based on a first clock that is not synchronized with a second clock based on which the second timestamp (t2) and the third timestamp (t3) are recorded.

21. The computer system of claim 15, wherein the latency monitor is further to:

determine an intra-host flow-based latency measurement associated with an intra-host packet flow between the first virtualized computing instance and a third virtualized computing instance that are both supported by the first computer system; and generate and store mapping information associating (a) the intra-host flow-based latency measurement with (b) tuple information associated with the intra-host packet flow.

* * * * *